United States Patent [19]
Palmers

[11] Patent Number: 5,758,597
[45] Date of Patent: Jun. 2, 1998

[54] ANIMAL FEEDING APPARATUS

[76] Inventor: Christian M. Palmers, Palmerstrasse 6-8, 2351 Wiener Neudorf, Austria

[21] Appl. No.: 931,393

[22] Filed: Sep. 16, 1997

[51] Int. Cl.$^6$ ............................................. A01K 5/02
[52] U.S. Cl. ............................................. 119/57.92
[58] Field of Search ...................... 119/57.92, 54, 119/56.1

[56] References Cited

U.S. PATENT DOCUMENTS

| | | | |
|---|---|---|---|
| 3,292,584 | 12/1966 | Brodrick | 119/57.92 |
| 3,473,696 | 10/1969 | Morris | 119/56.1 |
| 5,239,943 | 8/1993 | Kim | 119/56.1 |
| 5,483,923 | 1/1996 | Sabbara | 119/56.1 |
| 5,584,263 | 12/1996 | Sexton | 119/57.92 X |

*Primary Examiner*—Thomas Price
*Attorney, Agent, or Firm*—Elliott N. Kramsky

[57] ABSTRACT

Apparatus for delivering a fixed measure of feed to an animal on demand comprises: a sliding body mounted for vertical sliding movement on the apparatus between a first display position in which a display screen is presented to the animal and a second position in which a fixed measure of feed is presented to the animal on a feed supporting surface. Drive apparatus for moving the sliding body from the first position to the second position, maintaining the sliding body at the second position for a predetermined time period, and then moving the sliding body back to the first position, is operated by the animal touching or tapping on the screen. During each cycle of operation, any un-eaten feed is discharged for collection and a fresh measure of feed is removed from the container and delivered to the feed supporting surface for presentation to the animal during the next cycle.

6 Claims, 5 Drawing Sheets

5,758,597

ANIMAL FEEDING APPARATUS

FIELD OF THE INVENTION

The invention relates to apparatus intended for feeding birds or other animals and which is operative in response to a demand from the animal to deliver a measured supply of feed such as seed to the animal.

SUMMARY

The invention provides apparatus for delivering a fixed measure of feed to an animal on demand comprising:

a container for feed;

a sliding body mounted for vertical sliding movement on the apparatus between a first lower and a second upper position;

drive means for moving the sliding body from the first position to the second position, maintaining the sliding body at the second position for a predetermined time period, and then moving the sliding body back to the first position;

means mounted on the sliding body for removing a fixed measure of feed from the container as the body is moved from the first position to the second position;

a feed supporting surface carried on the body and adapted to be accessible to the animal when the body is in the second position;

means for delivering said fixed measure of feed to the feed supporting surface as the body is moved from the second position to the first position;

means for discharging unconsumed feed from the feed supporting surface; and operating means responsive to being touched by the animal to operate the drive means and adapted to be accessible to the animal when the body is in the first position.

DESCRIPTION OF THE PREFERRED EMBODIMENT

Figure 1:
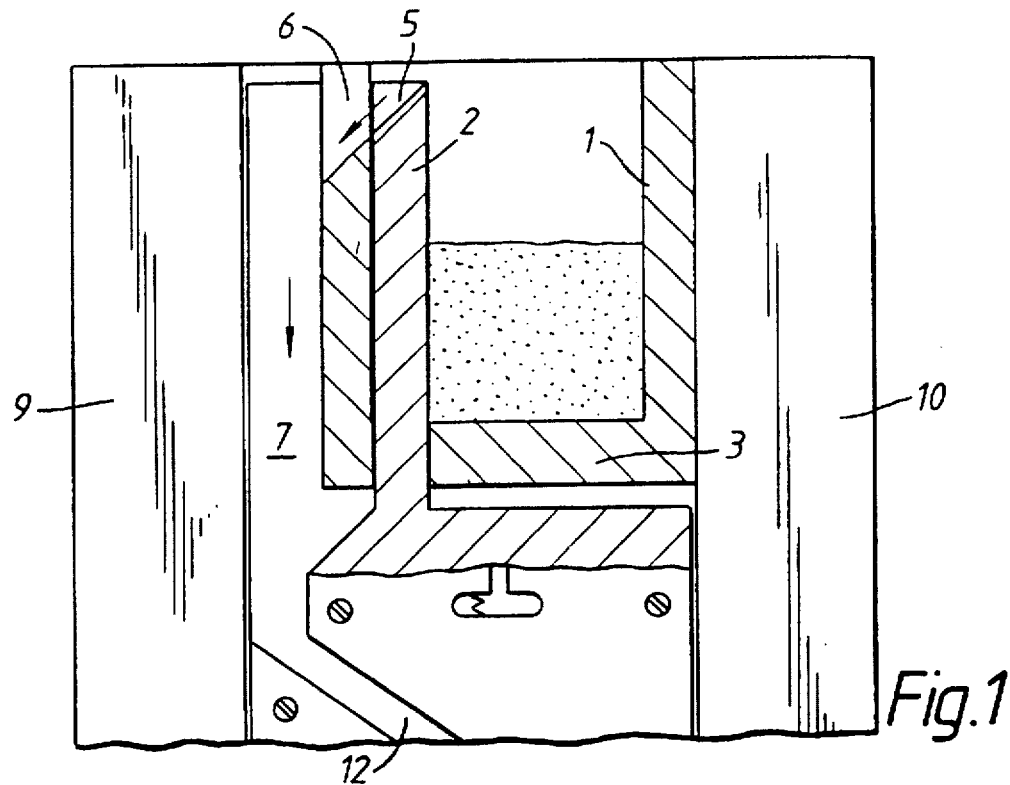
FIGS. 1 and 2 show upper parts of the apparatus in different operative positions.
Figure 2:
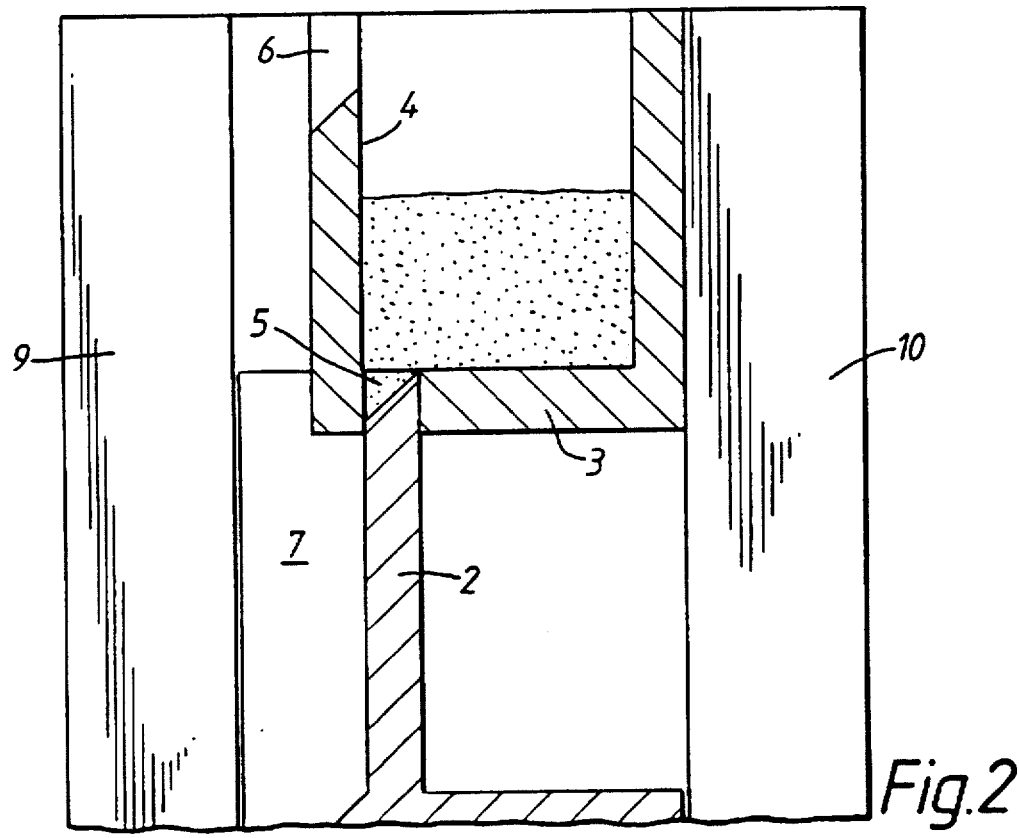

The apparatus shown in FIGS. 1 and 2 is an upward continuation of the apparatus of the other figures. FIGS. 1 and 2 show a part of the apparatus for removing seed in measured quantities from an open container 1.

A post 2 passes sealingly through an opening in the base 3 of the container and reciprocates vertically in the container between an upper position shown in FIG. 1 and a lower position shown in FIG. 2. The top of the post has an inclined cut-away portion which co-operates with the inside surface of a side wall 4 of the container to provide a measured feed-receiving recess 5. A corresponding inclined cut-away opening 6 is provided towards the upper end of the side wall 4. As the post rises from the position shown in FIG. 2, the recess 5 fills with a fixed measure of feed which is carried upwardly with the post. On reaching the position shown in FIG. 1, the measure of feed in the recess is discharged from the recess and runs out of the container through the inclined cut away opening 6 and into a chute 7.

Figure 3:
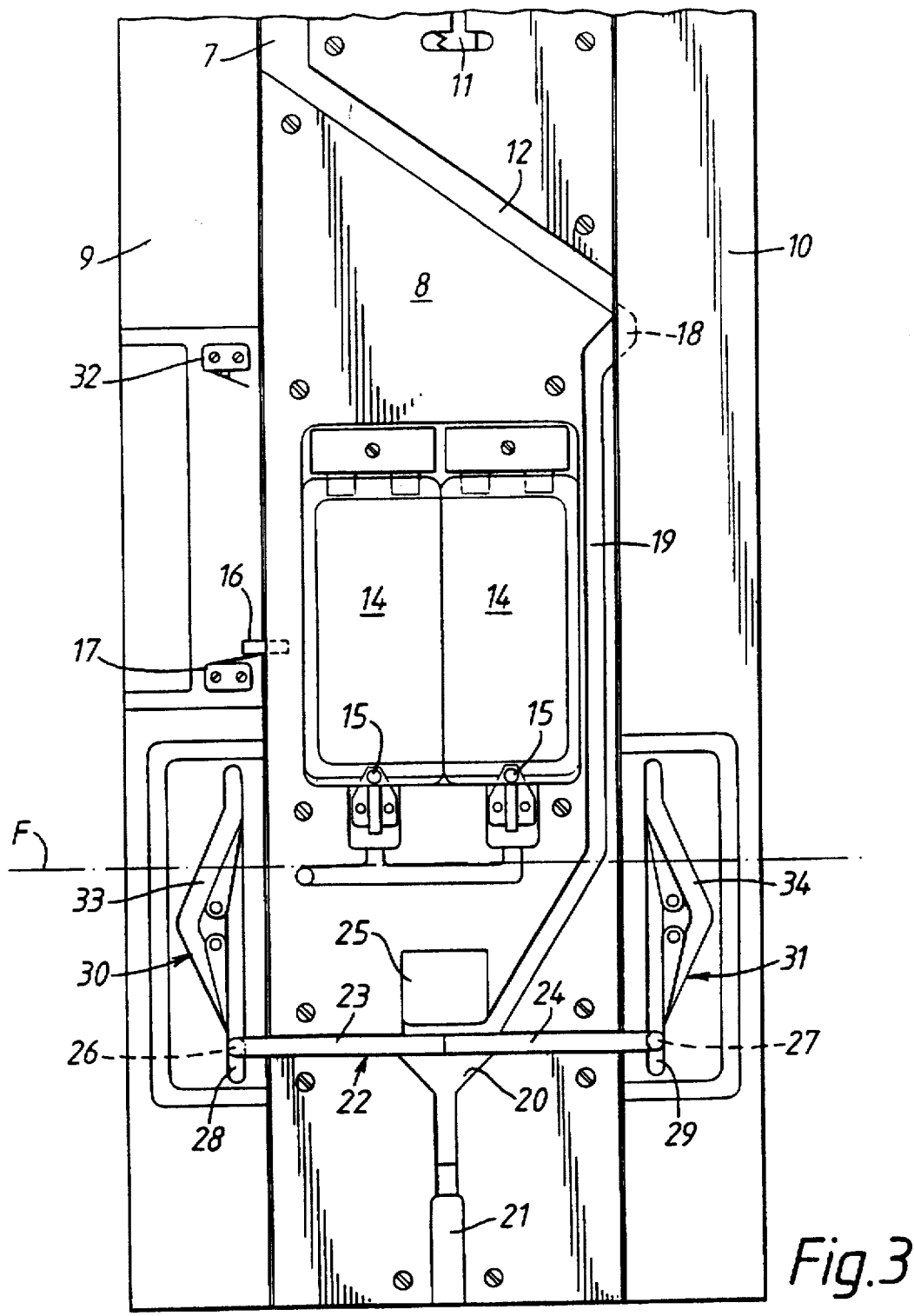
FIGS. 3–5 show lower parts of the apparatus in different operative positions.
Figure 4:
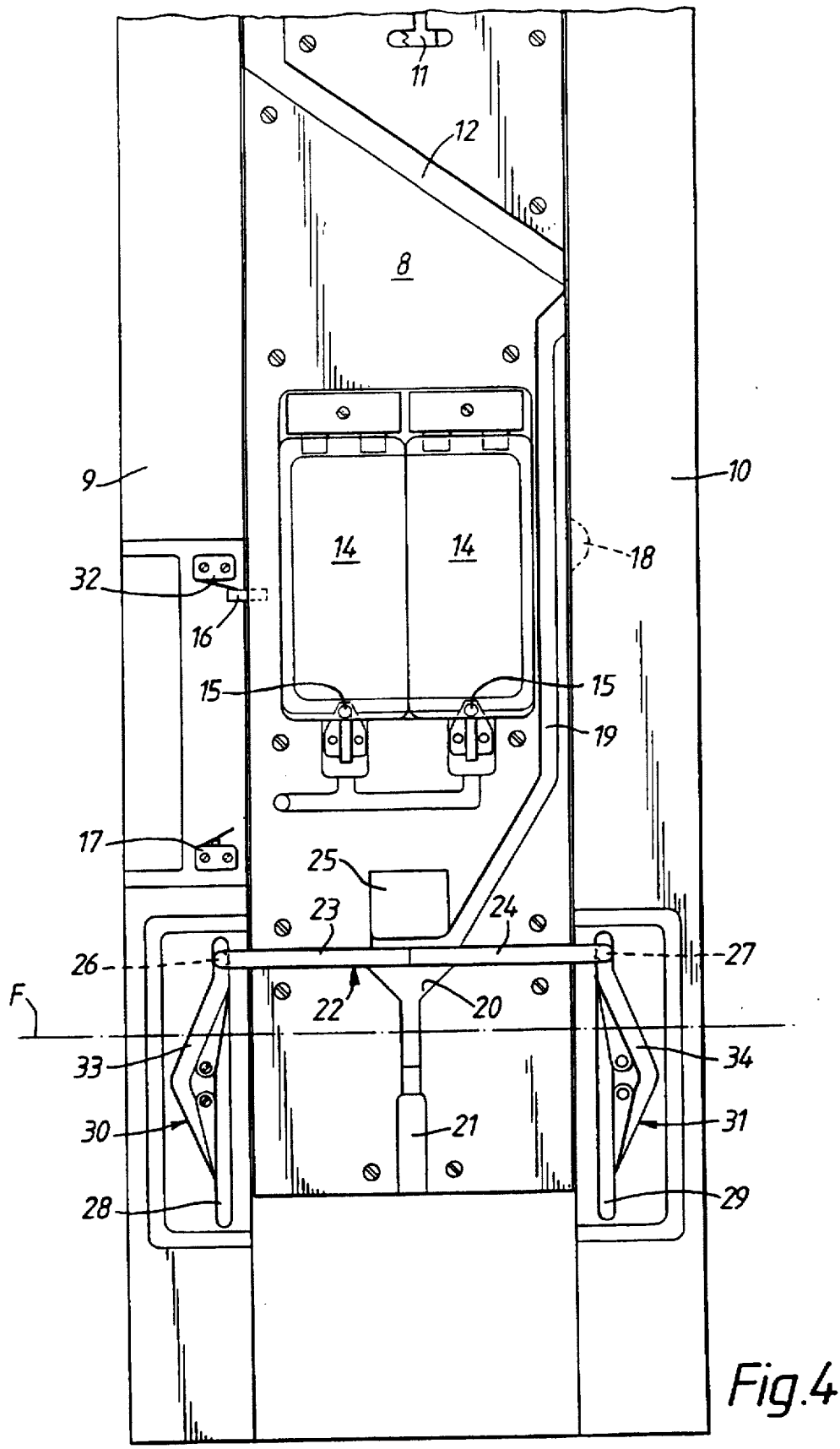
Figure 5:
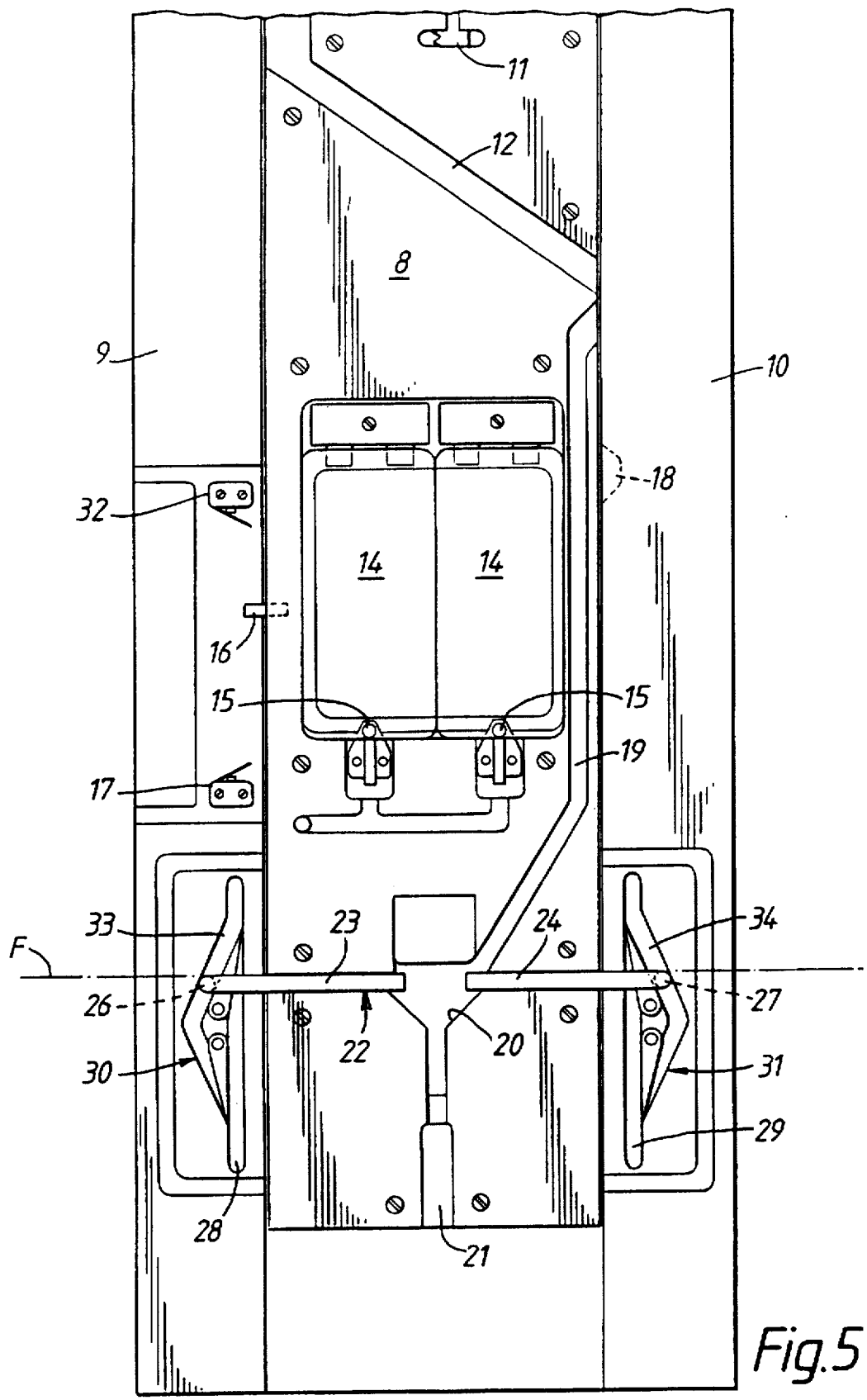

Referring now also to FIGS. 3–5, it can be seen that the apparatus generally comprises a central sliding body 8 which is mounted for vertical sliding movement between two fixed side members 9, 10. The sliding body 8 is adapted to be mounted adjacent a window or other opening in an animal cage such that it generally closes that opening or at least prevents the animal from exiting the cage through the opening. The approximate floor level in the cage is indicated by dotted line F. Vertical movement of the body 8 is driven through a rack and pinion arrangement by an electric motor. Of this drive arrangement, only a portion of the rack 11 can be seen in the figures.

From FIGS. 3–5 it can be seen that the chute 7 leads down to a further inclined chute 12 which is formed in the sliding body and which is normally closed at its lower end by the right hand side member 10.

The sliding body 8 carries a pair of glass screens 14 each having an associated piezo-electric element 15 located behind the glass and responsive to tapping on the glass by an animal. The piezo-electric elements are connected to the control system of the electric motor for operating the apparatus. Whilst two screens 14 and two elements 15 are shown, a single screen 14 and element 15 could also be used. An image is displayed on the screen to entice the animal to touch it or tap on it and thus to activate the piezo-electric elements.

In the position shown in FIG. 3, the body 8 is at is lowermost position in which a stop 16 fixed to the left-hand side of the body has triggered a micro-switch 17 and the motor is switched off. In this position the chute 12 communicates through a relief passage 18 in the side member 10 with a passageway 19 in the body 1 which at its lower end leads into a funnel 20 above a discharge passage 21. Also in this position, the funnel 20 is closed by a floor 22. The floor 22 is formed in two parts 23 and 24 which can reciprocate horizontally between the inner position shown in FIG. 3 in which the floor is closed above the funnel 20 to provide a feed supporting surface and an outer position shown in FIG. 5 where the floor parts 23,24 open to expose the funnel 20.

In the position shown in FIG. 3, the portion of seed last removed from the container 1 will have passed down chutes 7 and 12, through relief passage 18, down passageway 19 and onto the floor 22. The floor 22 is below the floor level of the cage in this position and so the measure of feed which is supported on the floor surface is inaccessible to the animal. The post 2 which is carried on the sliding body 8 will be in its lower position shown in FIG. 2.

In the position shown in FIG. 3, the screen 14 is presented at the level of the cage opening at a convenient position for engagement by the animal and if at any time the animal taps on one of the windows 14, the corresponding piezo-electric element 15 is activated to operate the motor to raise the body 8 to the uppermost position shown in FIG. 4. During this raising travel, the post 2 will rise through the feed in the container 1 and will deliver a controlled measure of seed or other feed to the chute 7. This feed will pass into the chute 12 and be retained at the bottom thereof by the side member 10. During the raising of the body, the floor 22 remains closed. Rods 26,27 on the outer ends of the floor parts 23,24 pass upwardly during this movement in the vertical limbs 28,29 of D-shaped guide tracks 30,31 fixed in each of the side members 9,10. At the uppermost position shown in FIG. 4, the stop 16 contacts a micro-switch 32 which stops the motor so that the body 8 remains stationary for a fixed period of time. During this period, which for example may be about 10–20 seconds, the floor 22 provides a supporting surface for the feed thereon which is presented at the cage opening at a convenient position for the animal to eat the feed through the cage opening 25.

At the end of the fixed feeding period, the motor is automatically reversed so that the body 8 descends. Spring-loaded deflectors mounted in the guide tracks are then operative to deflect the rods 26,27 into the angled limbs 33,34 of the guide tracks 30 and 31 and as the body descends, the floor parts are drawn apart such that the floor 22 opens and any un-eaten feed supported thereon drops into the funnel 20 and is discharged through the passage 21 for collection. This is the position shown in FIG. 5. When the body 8 returns to its lowermost position as shown in FIG. 3, the floor closes and the measure of feed held in chute 12 is able to fall through the relief passage 18 and passageway 19 onto the floor 22. The switch 17 is operated to stop the motor until reactivated by the animal tapping on one or other screen 14.

A brief description of the control system of the apparatus is given below with reference to FIG. 6.

Figure 6:
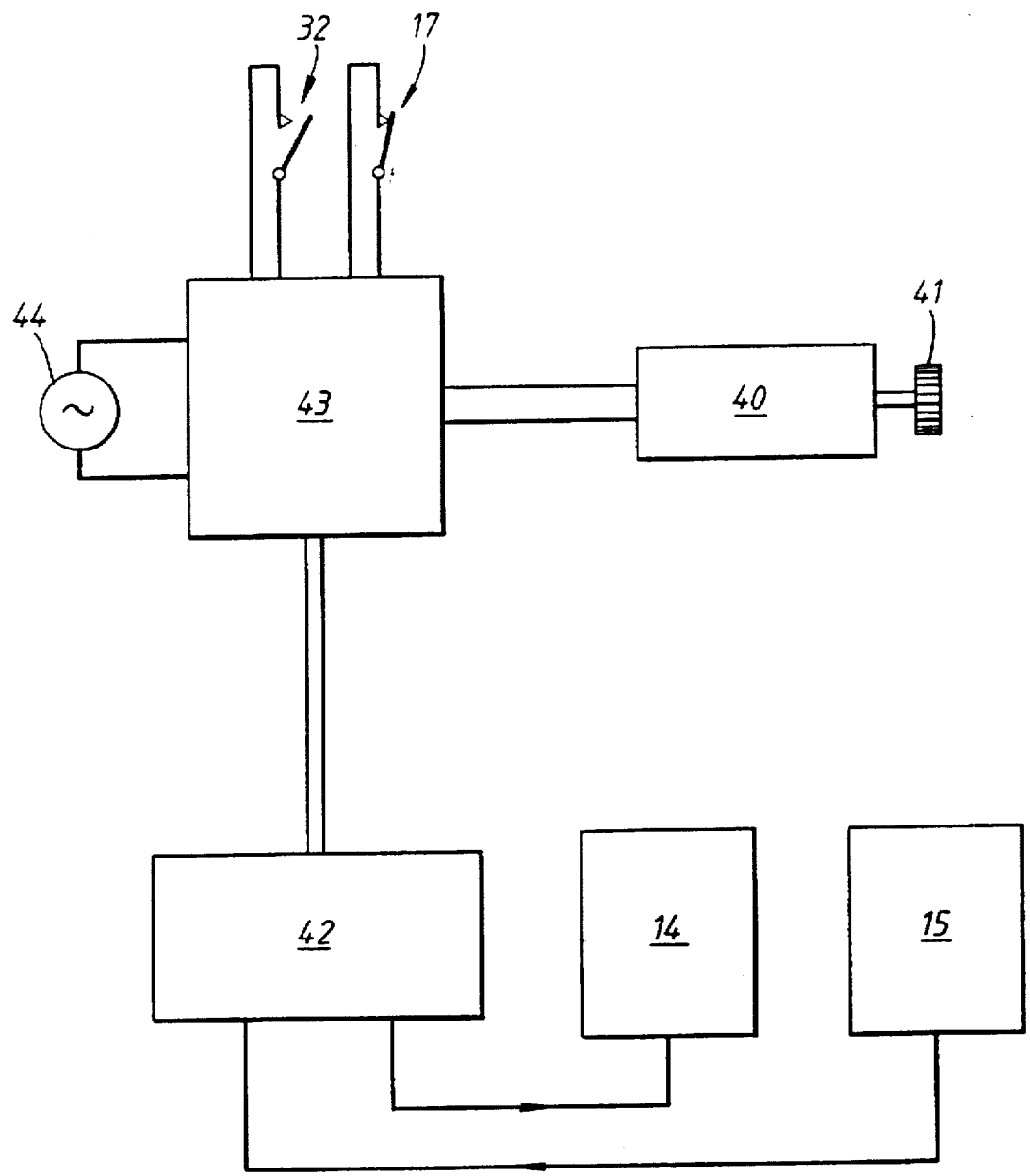
FIG. 6 is a block diagram of the circuit of the apparatus.

FIG. 6 is a block diagram of the electrical control circuit for the motor 40 which carries a gear 41 that meshes with the rack 11.

A central processing unit (CPU) 42 is programmed to present selected images on the screen 14 at selected intervals. The output of the piezo-electric element 15 is connected to the CPU 42 and the CPU 42 then checks to see if the element 15 is activated during the period that a selected image is displayed. If the answer is positive the CPU 42 sends a signal to a motor controller 43. The motor controller 43 responds to the output of the CPU and the two switches 17 and 32 to control the supply of energising power from a power source 44 to the motor 40.

In operation with the switch 17 closed and the switch 32 open, the controller 43 responds to the output of the CPU 42 to energise the motor 40. The motor 40 then starts to drive the body 8 upwardly and the switch 17 opens. When the body reaches the upper end of its upward stroke the switch 32 is closed and the controller 43 first de-energises the motor but after a predetermined delay supplies the power in reverse to the motor 40. The motor is thus driven in the opposite direction to cause the body 8 to start its downward stroke. At this point the switch 32 is again opened and when the body reaches the lower end of the downward stroke the switch 17 is again closed. The controller 43 responds to the closing of the switch 17 to de-energise the motor and reverses the connections to the motor in readiness for the next positive signal from the CPU 42. The cycle is then repeated.

It will be appreciated that many modifications of or alternatives to the components used in the embodiments described are possible. For example, the screen may be a touch screen and, instead of the piezoelectric elements, a pressure sensitive resistor mounted between the body and the screen may be used.

I claim:

1. Apparatus for delivering a fixed measure of feed to an animal on demand comprising:

a container for feed;

a sliding body mounted for vertical sliding movement on the apparatus between a first lower and a second upper position;

drive means for moving the sliding body from the first position to the second position, maintaining the sliding body at the second position for a predetermined time period, and then moving the sliding body back to the first position;

means mounted on the sliding body for removing a fixed measure of feed from the container as the body is moved from the first position to the second position;

a feed supporting surface carried on the body and adapted to be accessible to the animal when the body is in the second position;

means for delivering said fixed measure of feed to the feed supporting surface as the body is moved from the second position to the first position;

means for discharging unconsumed feed from the feed supporting surface; and operating means responsive to being touched by the animal to operate the drive means and adapted to be accessible to the animal when the body is in the first position.

2. Apparatus as claimed in claim 1, wherein the feed supporting surface comprises a floor formed in two parts which can reciprocate horizontally between a closed position in which feed can be supported thereon and an open position in which seed is discharged therefrom.

3. Apparatus as claimed in claim 2, wherein a funnel is located beneath the floor to collect discharged feed.

4. Apparatus as claimed in claimed in claim 1, wherein the operating means includes one or more display screens which can be touched by the animal when the body is in the first position and one or more piezo-electric elements located behind the screen and activated when the screen is touched.

5. Apparatus as claimed in claim 1, wherein the means for removing a fixed measure of feed from the container comprises a post mounted on the body and having a feed-receiving recess; wherein the post is raised through the container as the body moves from the first position to the second position and picks up a measure of feed in the recess; and wherein that measure of feed is discharged from the recess when the body reaches the second position.

6. Apparatus as claimed in claim 1, wherein the means for delivering the fixed measure of feed to the feed supporting surface comprises a passageway which is blocked when the body is in any position other than the first position.

* * * * *